(12) United States Patent
He

(10) Patent No.: US 9,164,227 B2
(45) Date of Patent: Oct. 20, 2015

(54) LED BACKLIGHT MODULE

(75) Inventor: Hu He, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 291 days.

(21) Appl. No.: 13/635,422

(22) PCT Filed: Jul. 27, 2012

(86) PCT No.: PCT/CN2012/079227
§ 371 (c)(1),
(2), (4) Date: Sep. 15, 2012

(87) PCT Pub. No.: WO2014/008687
PCT Pub. Date: Jan. 16, 2014

(65) Prior Publication Data
US 2014/0016352 A1    Jan. 16, 2014

(30) Foreign Application Priority Data
Jul. 13, 2012    (CN) .......................... 2012 1 0243709

(51) Int. Cl.
*F21V 8/00*    (2006.01)

(52) U.S. Cl.
CPC ............ *G02B 6/0091* (2013.01); *G02B 6/0085* (2013.01); *G02B 6/0088* (2013.01)

(58) Field of Classification Search
CPC combination set(s) only.
See application file for complete search history.

(56) References Cited

U.S. PATENT DOCUMENTS

| | | | |
|---|---|---|---|
| 2010/0149836 A1* | 6/2010 | Hung et al. | 362/634 |
| 2012/0092890 A1* | 4/2012 | Matsui | 362/607 |
| 2012/0170311 A1* | 7/2012 | Huang et al. | 362/611 |

FOREIGN PATENT DOCUMENTS

| | | |
|---|---|---|
| CN | 201803229 U | 4/2011 |
| CN | 102265085 A | 11/2011 |

* cited by examiner

*Primary Examiner* — Nimeshkumar Patel
*Assistant Examiner* — Brenitra M Lee
(74) *Attorney, Agent, or Firm* — Andrew C. Cheng

(57) ABSTRACT

The present invention relates to an LED backlight module, which includes an LGP, an LED light bar, a backplane, and a heat sink. The LED light bar is mounted on the heat sink at a location close to a light incidence side of the LGP. The heat sink forms upward-extending LGP positioning columns that are fixed with respect thereto. The LGP positioning columns extend upward and through the LGP so as to fix the LGP with respect to the heat sink. The heat sink is arranged on the backplane in a manner of being movable in a light incidence direction. The heat sink is movable with expansion or contraction of the LGP so as to maintain light coupling distance between the LGP and the LED light bar. The LED backlight module prevents the LGP from waving resulting from heat or mechanical interference.

10 Claims, 7 Drawing Sheets

LED BACKLIGHT MODULE

BACKGROUND OF THE INVENTION

1. Field of the Invention

The present invention relates to liquid crystal displaying techniques, and in particular to an LED (Light-Emitting Diode) backlight module.

2. The Related Arts

The LED backlight modules that are used in liquid crystal displaying techniques are generally classified in two types, direct backlight modules and side-edge backlight modules. For the side-edge LED backlight modules, with the increasing improvement of LED efficiency, the design for LED backlighting is also evolving, generally from the four-side incidence to two-side incidence, and then single-side incidence. The currently researches and future developments are both directed to the single side incidence.

The side-edge LED backlighting is constructed by arranging LED chips at circumferential edges of a liquid crystal panel and a light guide plate is included so that when the LED backlighting is energized in a sectionized manner, light from the edges of the liquid crystal panel travels through the light guide plate (LGP) to reach a central portion of the liquid crystal panel, providing sufficient backlighting to whole panel by which the liquid crystal panel may display an image. The side-edge LED backlighting generally has two advantages. One is that the number of LED chips used is less and thus the cost is saved. The second is that a thin and light-weighted device body is possible for LED modules are not arranged on the back side of the liquid crystal panel and are instead located on the sides. This reduces the overall thickness of the liquid crystal panel and thins a device body.

Referring to FIG. 1, a schematic view is given to illustrate the operation principle of a conventional side-edge LED backlight module. Single-side incidence is taken as example. The conventional side-edge LED backlight module generally comprises a light guide plate 10, an LED light bar 11, a backplane 12, and a heat sink 13. The light guide plate 10 is disposed on the backplane 12 and the heat sink 13 is arranged between the light guide plate 10 and the backplane 12. The LED light bar 11 that serves as a light source is arranged at one side of the light guide plate 10. The LED light bar 11, when put into operation, generates heat that is dissipated through the heat sink 13. A mold frame 14 is set above edges of the light guide plate 10 and a reflector board 15. The reflector board 15 is located above a light incident site between the LED light bar 11 and the light guide plate 10 to make the light emitting from the LED light bar 11 entering the light guide plate 10 as much as possible. The light is transmitted through the light guide plate 10 in the direction indicated by arrowheaded lines. Phantom line circles show where light is subjected to total internal reflection. By means of total internal reflection, light that enters from a side of the light guide plate 10 can be guided to travel along the light guide plate 10. The light guide plate 10 comprises grid dots 16 formed on an undersurface thereof and optic films 17 arranged above a top surface thereof. The grid dots 16 function to destroy the total internal reflection in order to allow light to emerge from the top surface of the light guide plate 10 to illuminate a liquid crystal panel (not shown) that is located above the light guide plate 10. The heat sink 13 is generally an aluminum extrusion. The backplane 12 can be an aluminum backplane. In the side-edge backlight module, the spacing distance between the LEDs and the light guide plate directly affects the efficiency that the LED is coupled to the light guide plate. The smaller the distance is, the higher the coupling efficiency will be. Namely, the backlighting efficiency is enhanced.

Referring to FIGS. 2 and 3, a perspective view is given to show the conventional side-edge LED backlight module with the light guide plate removed and FIG. 3 is a cross-sectional view of FIG. 2 showing the site where a bolt is located. It is often that an LED light bar 21 is fixed on a heat sink 22. The heat sink 22 is fixed to a backplane 24 by bolts 23 to fix the relative position thereof with respect to the backplane 24. To simplify the drawings, hatching is only shown in the site of the bolt 23 in the drawings. The LED light bar 21 comprises a plurality of LED chips 211 to serve as a light source. The backplane 24 is extended upward to form LGP positioning columns 25.

As shown in FIG. 4, which is a perspective view showing the backlight module of FIG. 2 with a light guide plate mounted thereto, the light guide plate 26 is fixed by the LGP positioning columns 25 provided on the backplane 24. The light guide plate 26 forms notches corresponding to the LGP positioning columns 25, whereby the LGP positioning columns 25 are allowed to extend upward through the notches to fix the light guide plate 26.

As shown in FIG. 5, a cross-sectional view is given to illustrate expansion of the light guide plate of the backlight module shown in FIG. 2. When the environment in which the backlight module operates changes, especially when the light guide plate 26 is subjected to expansion caused by being heated or absorbing humidity, it is likely that the light guide plate gets into contact with a short edge of the LED light bar 21. Such a variation may cause two risks, one being the risk of LED reliability, where the LEDs may get hit and thus damaged by the light guide plate and the other being waving occurring on vertical surface of the light guide plate due to the light guide plate being fixed in position by the LGP positioning columns and not allowed to extension in a lengthwise direction.

The known solutions keep a sufficient clearance for movement of the light guide plate in order to prevent waving of the light guide plate caused by the expansion of the light guide plate resulting from being heated or absorbing humidity, whereby the spacing distance between the light guide plate and the LEDs is increased and this reduces light coupling distance and thus greatly affects the efficiency of backlighting.

SUMMARY OF THE INVENTION

Thus, an object of the present invention is to provide an LED backlight module that maintains the light coupling distance between a light guide plate and LEDs and at the same time prevents the occurrence of waving of the light guide plate.

To achieve the above object, the present invention provides an LED backlight module, which comprises a light guide plate (LGP), an LED light bar, a backplane, and a heat sink. The LED light bar is mounted on the heat sink at a location close to a light incidence side of the LGP. The heat sink forms upward-extending LGP positioning columns that are fixed with respect thereto. The LGP positioning columns extend upward and through the LGP so as to fix the LGP with respect to the heat sink. The heat sink is arranged on the backplane in a manner of being movable in a light incidence direction. The heat sink is movable with expansion or contraction of the LGP so as to maintain light coupling distance between the LGP and the LED light bar.

Wherein, the backplane forms bolt holes for disposition of the heat sink. The heat sink is mounted to the backplane with bolts received through the bolt holes. After the bolts are tightened, the bolts are fixed in the bolt holes in a direction that is normal to the light incidence direction but are moveable within a predetermined range in the light incidence direction.

Wherein, the backplane forms bolt holes for disposition of the LGP positioning columns. The LGP positioning columns extend through the bolt holes and then penetrate positioning holes defined in the heat sink for further upward extension. The LGP positioning columns are fixed in the bolt holes in the direction normal to the light incidence direction and are moveable, within a predetermined range, in the light incidence direction.

Wherein, the LGP positioning columns are integrally formed with the heat sink.

Wherein, the heat sink comprises two support walls that are perpendicular to each other. The LED light bar is fixed to an inside surface of a first one of the support walls. The LGP positioning columns are mounted to an inside surface of a second one of the second support walls. The second support wall is arranged between the LGP and the backplane.

Wherein, one LED light bar is included and the LED backlight module is of single side incidence.

Wherein, two LED light bars are included and the LED backlight module is of two side incidence.

Wherein, the backplane is made of a resilient material.

Wherein, the LGP forms notches in the light incidence side thereof to correspond, in shape, to the LGP positioning columns. The LGP positioning columns extend upward through the notches.

The present invention also provides an LED backlight module, comprising a light guide plate (LGP), an LED light bar, a backplane, and a heat sink, the LED light bar being mounted on the heat sink at a location close to a light incidence side of the LGP, the heat sink forming upward-extending LGP positioning columns that are fixed with respect thereto, the LGP positioning columns extending upward and through the LGP so as to fix the LGP with respect to the heat sink, the heat sink being arranged on the backplane in a manner of being movable in a light incidence direction, the heat sink being movable with expansion or contraction of the LGP so as to maintain light coupling distance between the LGP and the LED light bar;

the backplane forming bolt holes for disposition of the heat sink, whereby the heat sink is mounted to the backplane with bolts received through the bolt holes and after the bolts are tightened, the bolts are fixed in the bolt holes in a direction that is normal to the light incidence direction but are moveable within a predetermined range in the light incidence direction;

the backplane forming bolt holes for disposition of the LGP positioning columns, the LGP positioning columns extending through the bolt holes and then penetrating positioning holes defined in the heat sink for further upward extension, the LGP positioning columns being fixed in the bolt holes in the direction normal to the light incidence direction and being moveable, within a predetermined range, in the light incidence direction;

the LGP positioning columns being integrally formed with the heat sink;

the heat sink comprising two support walls that are perpendicular to each other, the LED light bar being fixed to an inside surface of a first one of the support walls, the LGP positioning columns being mounted to an inside surface of a second one of the second support walls, the second support wall being arranged between the LGP and the backplane;

further comprising one LED light bar, the LED backlight module being of single side incidence;

the backplane being made of a resilient material; and the LGP forming notches in the light incidence side thereof to correspond, in shape, to the LGP positioning columns, the LGP positioning columns extending upward through the notches.

The LED backlight module of the present invention prevents waving from occurring on the light guide plate due to mechanical interference resulting from being heated or absorption of humidity, avoids failure of LEDs caused by the light guide plate impacting the LEDs due to expansion resulting from being heated or absorption of humidity, and maintains the light coupling distance between the light guide plate and the LEDs so as to improve light coupling efficiency.

DETAILED DESCRIPTION OF THE PREFERRED EMBODIMENTS

Figure 1:
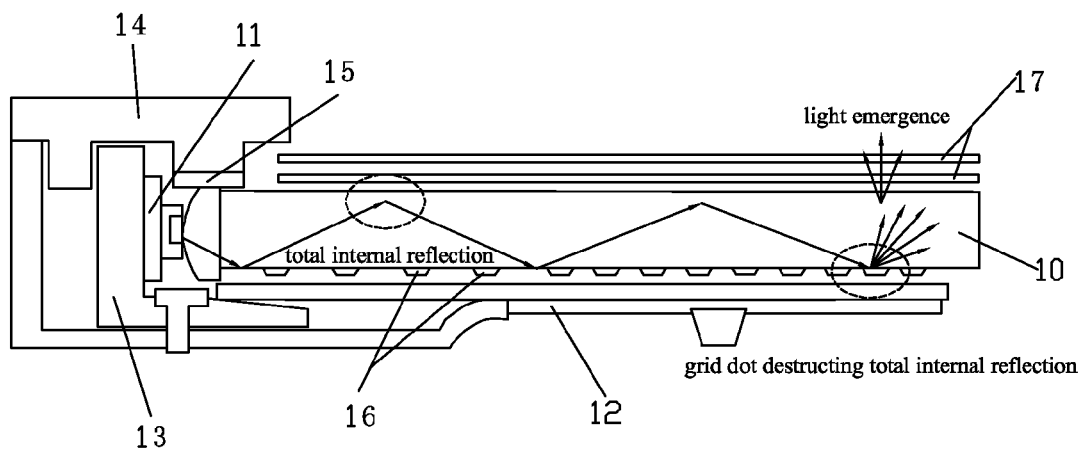
FIG. 1 is a schematic view illustrating the operation principle of a conventional side-edge LED backlight module.
Figure 2:
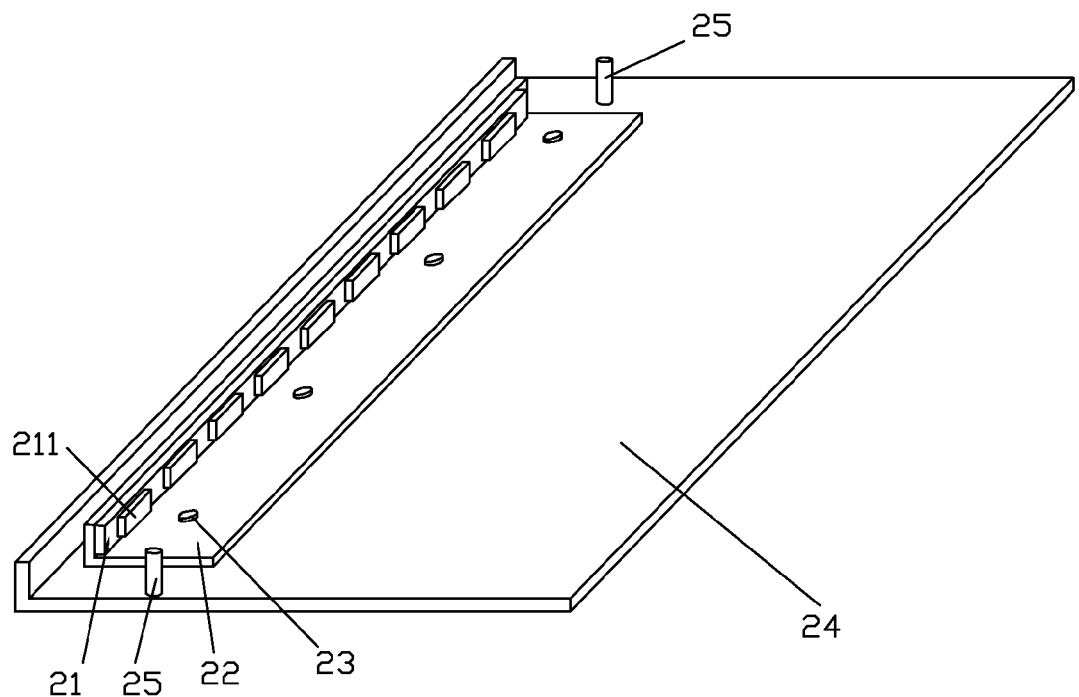
FIG. 2 is a perspective view showing the conventional side-edge LED backlight module with a light guide plate removed.
Figure 3:
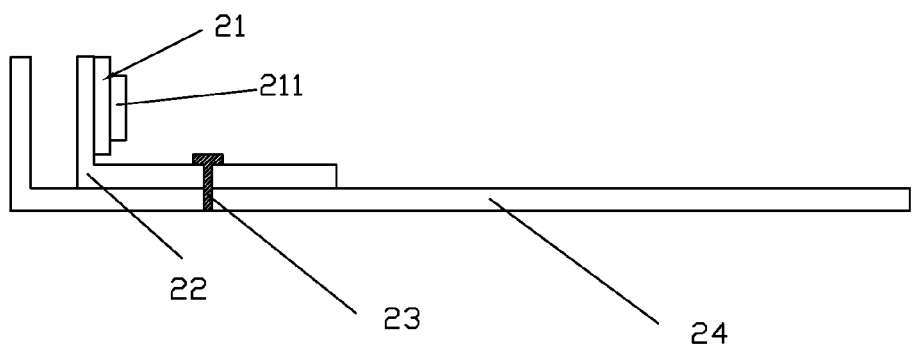
FIG. 3 is a cross-sectional view of FIG. 2 showing the site where a bolt is located.
Figure 4:
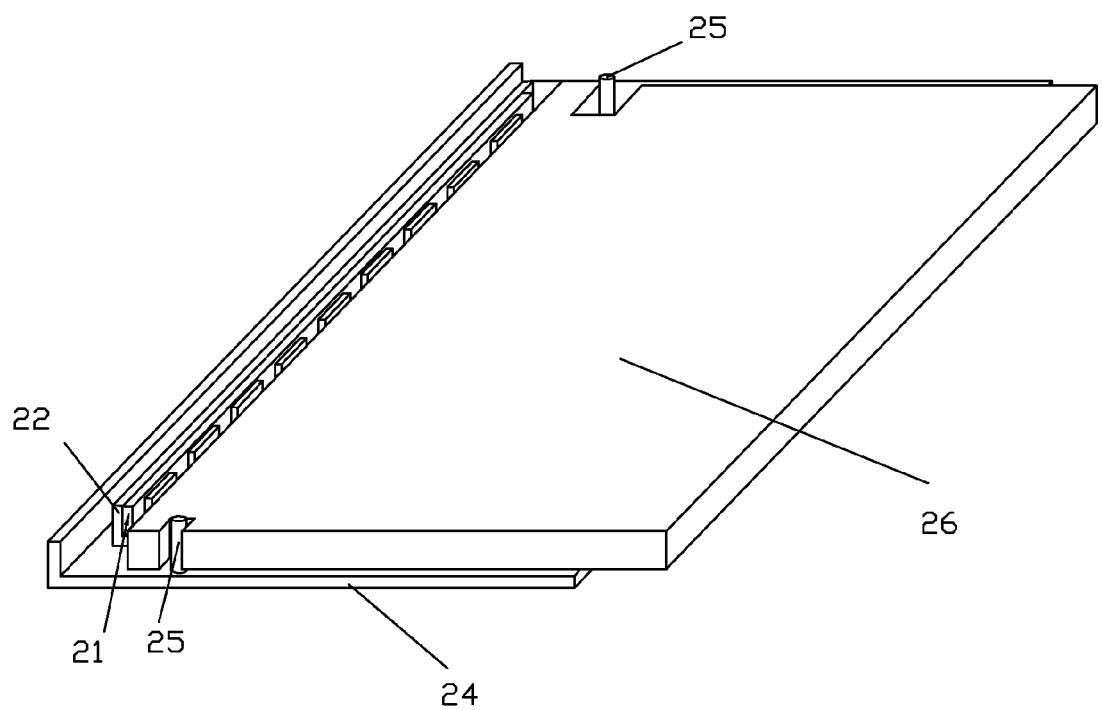
FIG. 4 is a perspective view showing the backlight module of FIG. 2 with a light guide plate mounted thereto.
Figure 5:
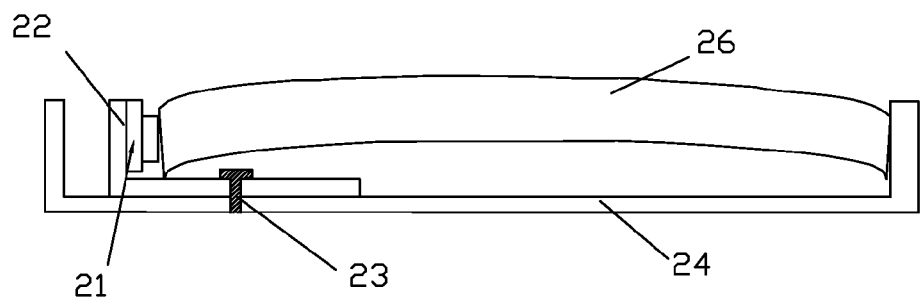
FIG. 5 is a cross-sectional view illustrating expansion of the light guide plate of the backlight module shown in FIG. 2.
Figure 6:
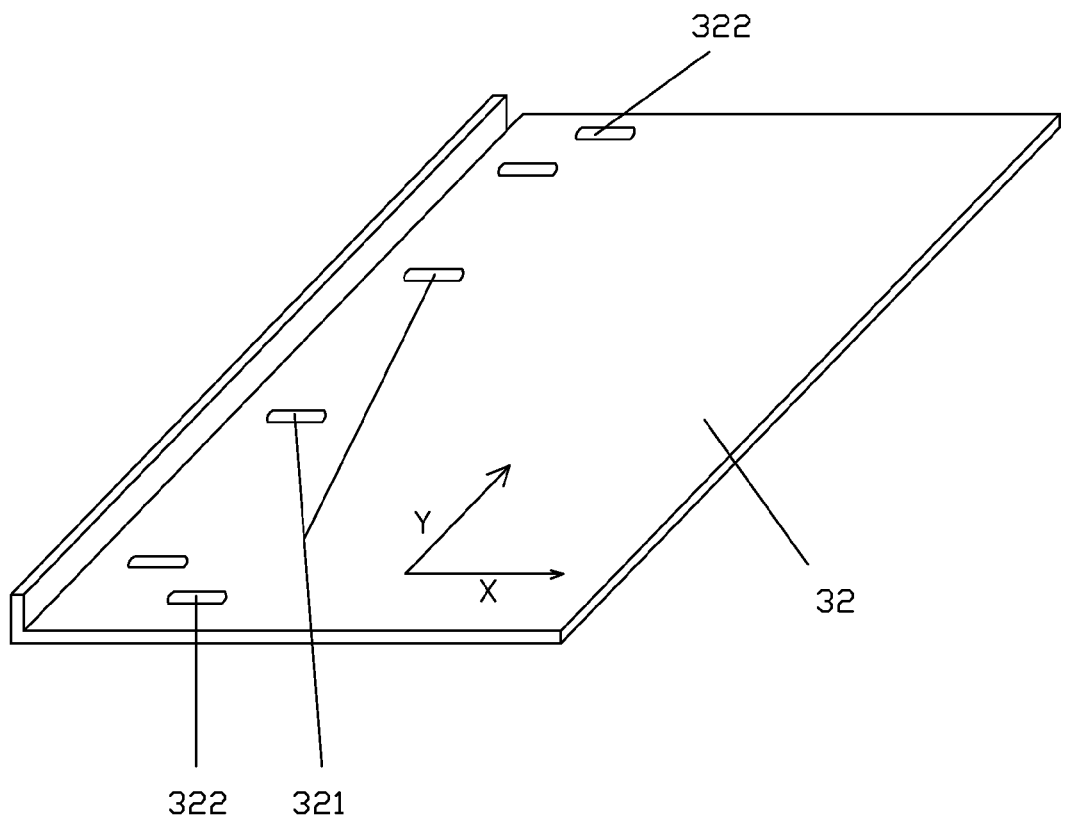
FIG. 6 is a perspective view showing a backplane of an LED backlight module according to a preferred embodiment of the present invention.
Figure 7:
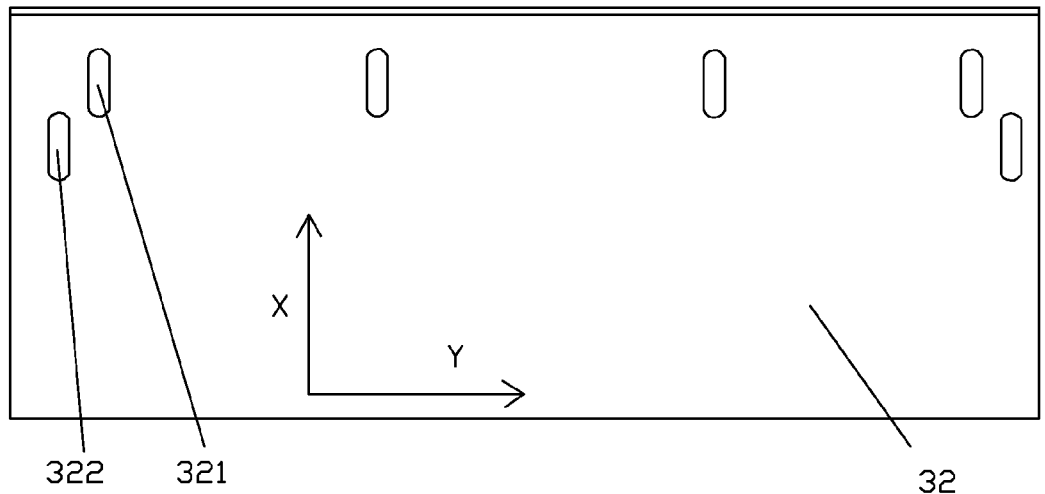
FIG. 7 is a top plan view of the backplane of FIG. 6.
Figure 8:
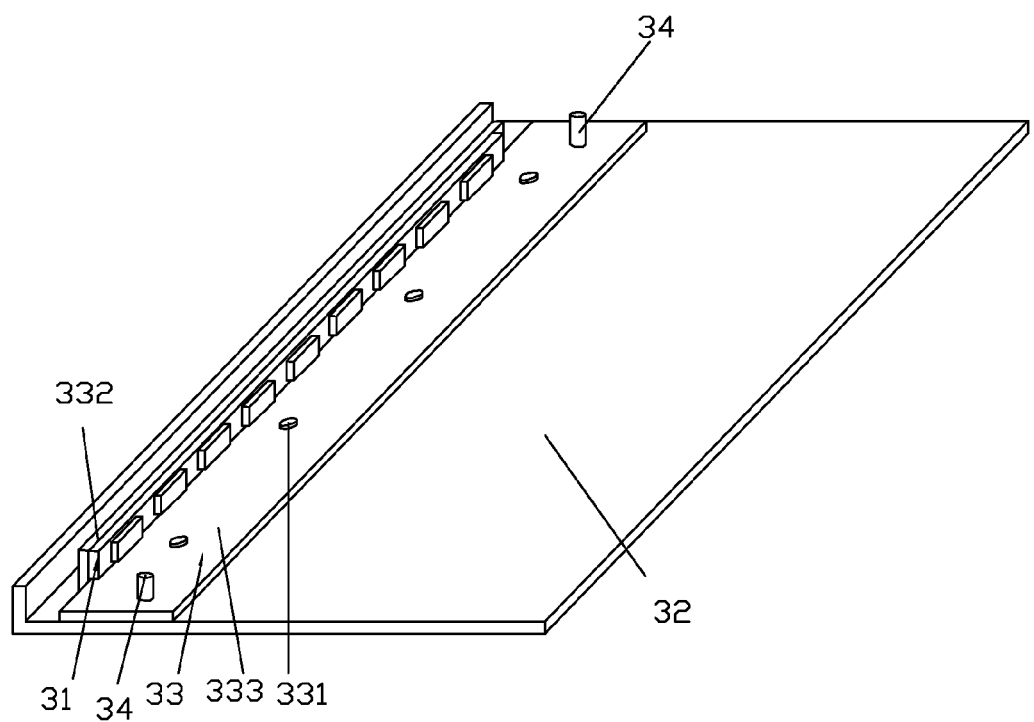
FIG. 8 is a perspective view showing the LED backlight module according to a preferred embodiment of the present invention with a light guide plate removed.
Figure 9:
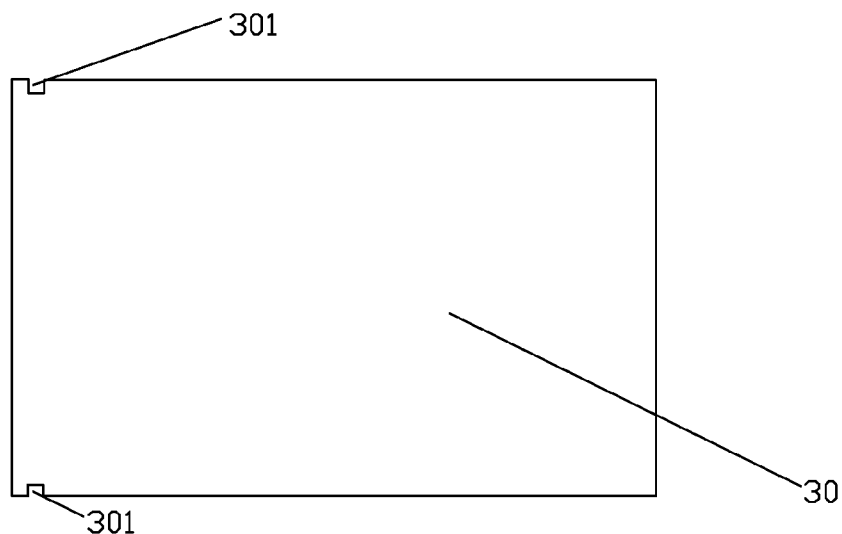
FIG. 9 is a top plan view of the light guide plate of the LED backlight module according to a preferred embodiment of the present invention.
Figure 10:
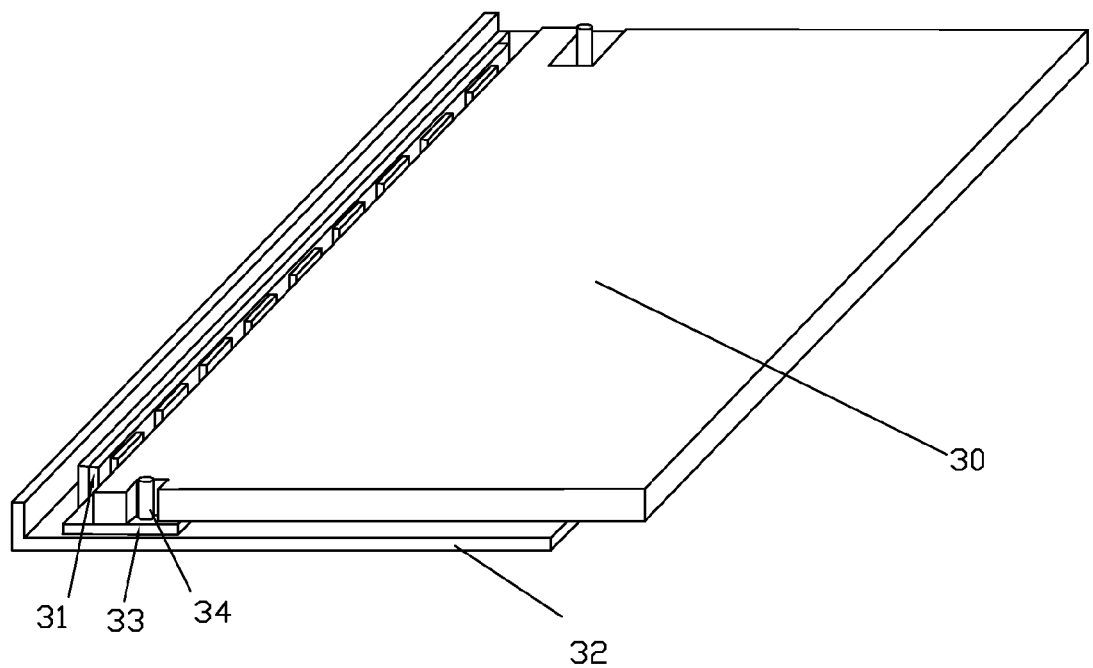
FIG. 10 is schematic view illustrating assembling of the LED backlight module according to a preferred embodiment of the present invention.

Referring to FIGS. 6-10, FIG. 6 is a perspective view showing a backplane of an LED backlight module according to a preferred embodiment of the present invention; FIG. 7 is a top plan view of the backplane of FIG. 6; FIG. 8 is a perspective view showing the LED backlight module according to a preferred embodiment of the present invention with a light guide plate removed; FIG. 9 is a top plan view of the light guide plate of the LED backlight module according to a preferred embodiment of the present invention; and FIG. 10 is schematic view illustrating assembling of the LED backlight module according to a preferred embodiment of the present invention.

The present invention provides an LED backlight module, which generally comprises a light guide plate (LGP) 30, an LED light bar 31, a backplane 32, and a heat sink 33. The LED light bar 31 is mounted on the heat sink 33 at a location close to a light incidence side of the LGP 30. The heat sink 33 forms upward-extending LGP positioning columns 34 that are fixed with respect thereto. The LGP positioning columns 34 extend upward and through the LGP 30 so as to fix the LGP 30 with respect to the heat sink 33. The heat sink 33 is arranged on the backplane 32 in a manner of being movable in the light incidence direction. The heat sink 33 is movable with expansion or contraction of the LGP 30 so as to maintain light coupling distance between the LGP 30 and the LED light bar 31.

The backplane 32 are provided with bolt holes 321 for the disposition of the heat sink 33, whereby the heat sink 33 is mounted to the backplane 32 with bolts 331 received through the bolt holes 321. The bolt holes 321 are generally elongated linear slots. The bolts 331 are fixed in the bolt holes 321 in a Y direction that is normal to the light incidence direction, but are allowed to move, within a predetermined range, in an X direction that is along the light incidence direction. The backplane 32 are further provided with bolt holes 322 for disposition of the LGP positioning columns 34. The LGP positioning columns 34 extend through the bolt holes 322 and then penetrate positioning holes defined in the heat sink 33 for further upward extension. The LGP positioning columns 34 are fixed in the bolt holes 322 in the Y direction normal to the light incidence direction and are allowed to move, within a predetermined range, in the X direction that is along the light incidence direction. In the preferred embodiment, the bolt holes 321, 322 and the LGP positioning columns 34 and the heat sink 33 are kept relatively fixed to each other and a LGP positioning column 34 is set at each of upper and lower edges.

In the LED backlight module of the present invention, the number of the bolt holes formed in the backplane 32 can be an arbitrary number. Further, the LGP positioning columns 34 can be integrally formed with the heat sink 33, whereby the LGP positioning columns 34 directly extend from the heat sink 33 in an upward direction. The number of the LGP positioning columns 34 can also be arbitrary.

The heat sink 33 comprises two support walls 332 and 333 that form a right angle therebetween, whereby the connection portion of the heat sink shows an L-shape. The LED light bar 31 is fixed to an inside surface of the first support wall 332. The LGP positioning columns 34 are arranged on an inside surface of the second support wall 333. The second support wall 333 is located between the LGP 30 and the backplane 32.

Light incidence for the LED backlight module according to the present invention can be single side incidence or multiple side incidence. The LED backlight module of the present invention may comprise one LED light bar, which makes single side incidence. The LED backlight module of the present invention may alternatively comprise two LED light bars, making it two side incidence. The backplane 32 is preferably made of a resilient material. The LGP 30 may have a shape of rectangle and the general concern is that the positioning configuration of the light incidence side of the LGP 30 must correspond to the LGP positioning columns 34. In the preferred embodiment, the light incidence side of the LGP 30 is provided with notches 301 that correspond in shape to the LGP positioning columns 34, whereby the LGP positioning columns 34 are allowed to extend upward through the notches 301.

Figure 11:
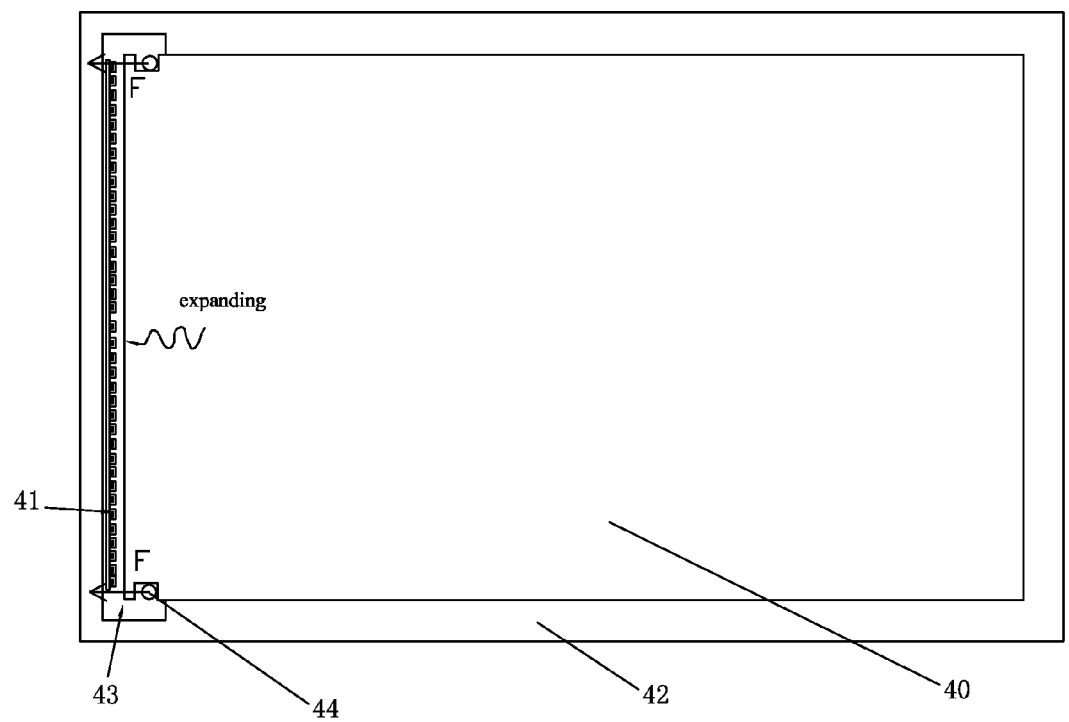
FIG. 11 is a schematic view illustrating the operation principle of the LED backlight module according to the present invention, where the light guide plate is in an expansion condition.
Figure 12:
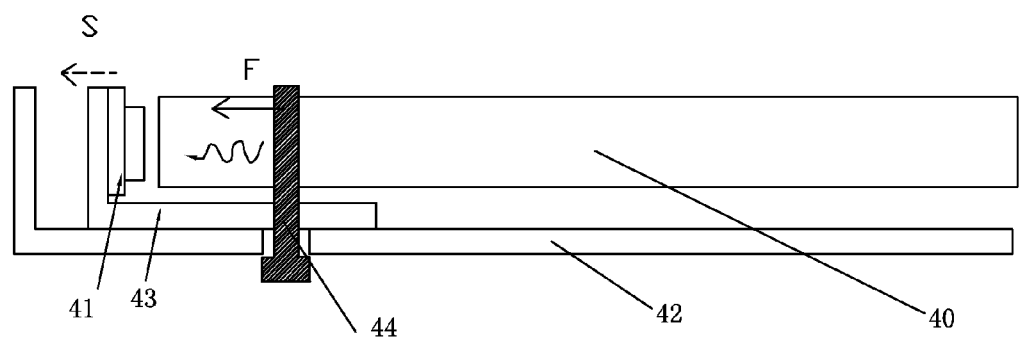
FIG. 12 is a cross-sectional view of FIG. 11.

Referring to FIGS. 11 and 12, FIG. 11 illustrates the operation principle of the LED backlight module according to the present invention, in which the LGP is in an expansion condition, and FIG. 12 is a cross-sectional view of FIG. 11. In the side-edge LED backlight module of the present invention, the LGP positioning columns 44 of the LGP 40 are fixed to the heat sink 43 and the heat sink 43 and the backplane 42 are relatively movable with respect to each other. The heat sink 43 is movable with the expansion or contraction of the LGP so as to maintain the light coupling distance between the LGP 40 and the LED light bar 41. When the LGP 40 expands, due to the interference thereof with the LGP positioning columns 44, the LGP 40 applies a force F to the LGP positioning columns 44. Since the LGP positioning columns 44 are fixed to the heat sink 43, such a force would act on the heat sink 43, making the heat sink 43 move in the expansion direction S of the LGP 40.

Figure 13:
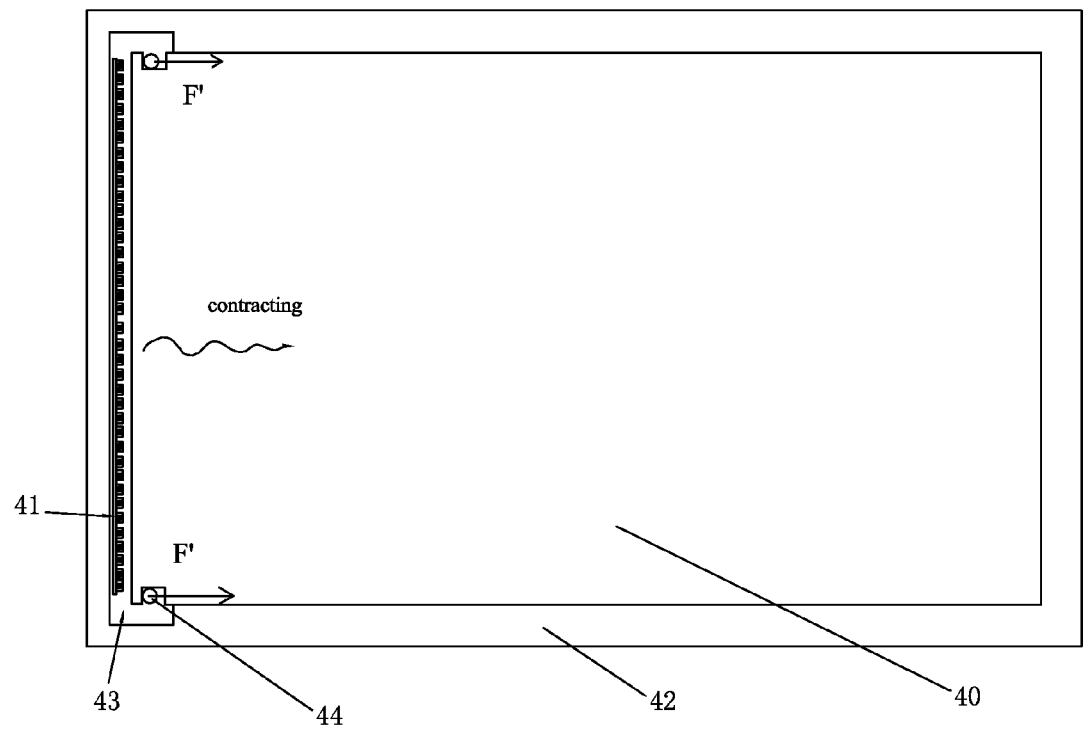
FIG. 13 is a schematic view illustrating the operation principle of the LED backlight module according to the present invention, where the light guide plate is in a contraction condition.
Figure 14:
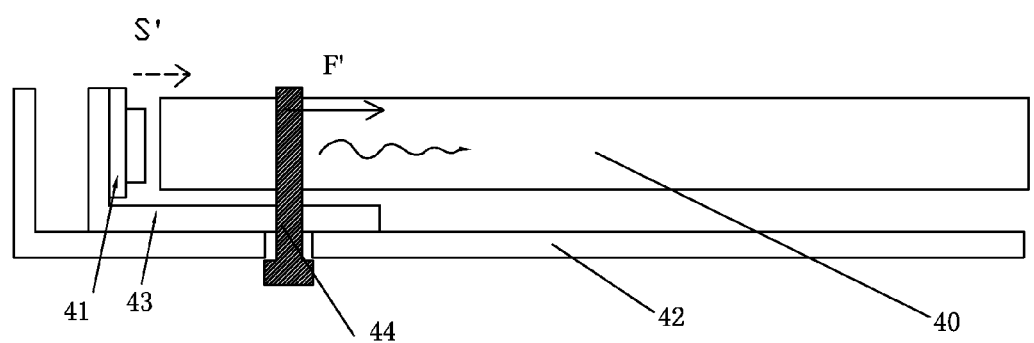
FIG. 14 is a cross-sectional view of FIG. 13.

Referring to FIGS. 13 and 14, FIG. 13 is a schematic view illustrating the operation principle of the LED backlight module according to the present invention, where the LGP is in a contraction condition, and FIG. 14 is a cross-sectional view of FIG. 13. When the LGP 40 gets cooled down and contracts, due to the interference thereof with the LGP positioning columns 44, the LGP 40 applied a force F' to the LGP positioning columns 44. Since the LGP positioning columns 44 are fixed to the heat sink 43, such a force would act on the heat sink 43, making the heat sink 43 move in the contraction direction S' of the LGP 40.

In summary, the present invention provides an LED backlight module that maintains the light coupling distance between an LGP and LEDs to thereby improve the backlighting efficiency. In an environment of high temperature and high humidity, the LGP expands and makes the heat sink (together with an LED light bar) move to eliminate waving of the LGP resulting from interference occurring at opposite sides and thus improve poor quality. When the temperature and humidity get lowered down, the LGP contracts and, because of the resilient material at edges of the backplane, makes the heat sink (together with an LED light bar) move thereby maintaining the light coupling distance between the LGP and the LED light bar.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An LED backlight module, comprising a light guide plate (LGP), an LED light bar, a backplane comprising elongate linear slots formed therein and extending in a lengthwise direction, and a heat sink, the LED light bar being mounted on the heat sink at a location close to a light incidence side of the LGP and emitting light traveling in a light incidence direction to get incident to the light incidence side of the LGP, the light incidence direction being parallel to the lengthwise direction of the elongate linear slots of the backplane, the heat sink forming upward-extending LGP positioning columns that are fixed with respect thereto, the LGP positioning columns extending upward and through the LGP so as to fix the LGP with respect to the heat sink and also extending downward to be moveably receiving in the elongate linear slots of the backplane, wherein the heat sink is arranged on the backplane and is movable with respect to the backplane in the light incidence direction by being guided by the movement of the LGP positioning columns in the lengthwise direction of the elongate linear slots of the backplane, the heat sink being movable in unison with a portion of the LGP in the lengthwise direction of the elongate linear slots of the backplane with expansion or contraction of the LGP so as to maintain light coupling distance between the LGP and the LED light bar.

2. The LED backlight module as claimed in claim 1, wherein the backplane forms bolt holes for disposition of the heat sink, whereby the heat sink is mounted to the backplane with bolts received through the bolt holes and after the bolts are tightened, the bolts are fixed in the bolt holes in a direction that is normal to the light incidence direction but are moveable within a predetermined range in the light incidence direction.

3. The LED backlight module as claimed in claim 1, wherein the backplane forms bolt holes for disposition of the LGP positioning columns, the LGP positioning columns extending through the bolt holes and then penetrating positioning holes defined in the heat sink for further upward extension, the LGP positioning columns being fixed in the bolt holes in the direction normal to the light incidence direction and being moveable, within a predetermined range, in the light incidence direction.

4. The LED backlight module as claimed in claim 1, wherein the LGP positioning columns are integrally formed with the heat sink.

5. The LED backlight module as claimed in claim 1, wherein the heat sink comprises two support walls that are perpendicular to each other, the LED light bar being fixed to an inside surface of a first one of the support walls, the LGP positioning columns being mounted to an inside surface of a second one of the second support walls, the second support wall being arranged between the LGP and the backplane.

6. The LED backlight module as claimed in claim 1 comprising one LED light bar and the LED backlight module being of single side incidence.

7. The LED backlight module as claimed in claim 1 comprising two LED light bars and the LED backlight module being of two side incidence.

8. The LED backlight module as claimed in claim 1, wherein the backplane is made of a resilient material.

9. The LED backlight module as claimed in claim 1, wherein the LGP forms notches in the light incidence side thereof to correspond, in shape, to the LGP positioning columns, the LGP positioning columns extending upward through the notches.

10. An LED backlight module, comprising a light guide plate (LGP), an LED light bar, a backplane comprising elongate linear slots formed therein and extending in a lengthwise direction, and a heat sink, the LED light bar being mounted on the heat sink at a location close to a light incidence side of the LGP and emitting light traveling in a light incidence direction to get incident to the light incidence side of the LGP, the light incidence direction being parallel to the lengthwise direction of the elongate linear slots of the backplane, the heat sink forming upward-extending LGP positioning columns that are fixed with respect thereto, the LGP positioning columns extending upward and through the LGP so as to fix the LGP with respect to the heat sink and also extending downward to be moveably receiving in the elongate linear slots of the backplane, wherein the heat sink is arranged on the backplane and is movable with respect to the backplane in the light incidence direction by being guided by the movement of the LGP positioning columns in the lengthwise direction of the elongate linear slots of the backplane, the heat sink being movable in unison with a portion of the LGP in the lengthwise direction of the elongate linear slots of the backplane with expansion or contraction of the LGP so as to maintain light coupling distance between the LGP and the LED light bar;

wherein the backplane comprises a bottom board on which the light source is positioned and a first side board connected to the bottom board;

the backplane forming bolt holes for disposition of the heat sink, whereby the heat sink is mounted to the backplane with bolts received through the bolt holes and after the bolts are tightened, the bolts are fixed in the bolt holes in a direction that is normal to the light incidence direction but are moveable within a predetermined range in the light incidence direction;

the backplane forming bolt holes for disposition of the LGP positioning columns, the LGP positioning columns extending through the bolt holes and then penetrating positioning holes defined in the heat sink for further upward extension, the LGP positioning columns being fixed in the bolt holes in the direction normal to the light incidence direction and being moveable, within a predetermined range, in the light incidence direction;

the LGP positioning columns being integrally formed with the heat sink;

the heat sink comprising two support walls that are perpendicular to each other, the LED light bar being fixed to an inside surface of a first one of the support walls, the LGP positioning columns being mounted to an inside surface of a second one of the second support walls, the second support wall being arranged between the LGP and the backplane;

further comprising one LED light bar, the LED backlight module being of single side incidence;

the backplane being made of a resilient material; and the LGP forming notches in the light incidence side thereof to correspond, in shape, to the LGP positioning columns, the LGP positioning columns extending upward through the notches.

* * * * *